United States Patent
Wörn et al.

[11] Patent Number: 6,134,102
[45] Date of Patent: Oct. 17, 2000

[54] PROGRAMMING DEVICE

[75] Inventors: Heinz Wörn, Derching; Erwin Hajdu, Augsburg, both of Germany

[73] Assignee: Kuka Roboter GmbH, Germany

[21] Appl. No.: 08/981,007

[22] PCT Filed: Jul. 20, 1996

[86] PCT No.: PCT/EP96/03211

§ 371 Date: Dec. 16, 1997

§ 102(e) Date: Dec. 16, 1997

[87] PCT Pub. No.: WO97/04369

PCT Pub. Date: Feb. 6, 1997

[30] Foreign Application Priority Data

Jul. 22, 1995 [DE] Germany ......................... 295 11 862 U
Jul. 22, 1995 [DE] Germany ......................... 295 11 863 U

[51] Int. Cl.[7] .................................................... G06F 1/16
[52] U.S. Cl. .................................. 361/680; 361/683
[58] Field of Search .................. 235/472.01, 472.02, 235/462.45, 462.46, 462.47; 361/680, 683

[56] References Cited

U.S. PATENT DOCUMENTS

| | | |
|---|---|---|
| 4,348,142 | 9/1982 | Figour . |
| 4,888,708 | 12/1989 | Brantmark et al. ................ 364/513 |
| 4,983,818 | 1/1991 | Knowles ............................. 235/472 |
| 5,063,376 | 11/1991 | Chang . |
| 5,267,181 | 11/1993 | George . |
| 5,294,782 | 3/1994 | Kumar ................................. 235/462 |
| 5,432,510 | 7/1995 | Matthews . |

FOREIGN PATENT DOCUMENTS

| | | |
|---|---|---|
| 0 303 708 | 2/1989 | European Pat. Off. . |
| 0 310 958 | 4/1989 | European Pat. Off. . |
| 38 02 802 | 8/1988 | Germany . |
| 88 06 214 U | 4/1989 | Germany . |
| 3-3787 | 1/1991 | Japan . |
| 2 204 426 | 11/1988 | United Kingdom . |
| WO 95/12843 | 5/1995 | WIPO . |

OTHER PUBLICATIONS

Brantmark, Lindqvist, Norefors, 1982, Man/machine communication in ASEA's new robot controller, ASEA Journal, 1982, vol. 55, No. 6, pp. 145–150.

*Primary Examiner*—Leo P. Picard
*Assistant Examiner*—Tung Minh Bui
*Attorney, Agent, or Firm*—McGlew and Tuttle, P.C.

[57] ABSTRACT

The present invention pertains to a programming device (1) for multiaxial industrial robots. The housing (2) has a display (3) and a plurality of switches and/or function keys (4). It has three or more ergonomically designed grip areas (6, 7, 8, 9), wherein grip strips (6, 7, 8) are made in one piece with two or more housing edges (25, 26), and the function keys (4) are located on these grip strips within the reach of the fingers. A joystick (14) is arranged horizontally at the lateral housing edge (26), and a grip strip (8) and a thumb ball pad (15) are located in its vicinity. The housing (2) also has one or more interfaces (16, 17) for connection to external communications means, especially external input or output devices and/or external computing units.

29 Claims, 4 Drawing Sheets

PROGRAMMING DEVICE

The present invention pertains to a programming device for manipulators, especially for multiaxial industrial robots, with a display, a plurality of switches, and at least one grip area on a housing.

Such a programming device has been known from EP-A-0 310 958. It comprises a narrow, box-shaped housing, which has a display screen, a plurality of switches, as well as function keys and a grip surface on both sides. A hand strap or clamp is present for the left hand for securing. The device can be held only in one way, which is fatiguing in the long run. In addition, it has no joystick.

Another programming device is shown in DE-U-88 06 214. It is likewise intended for being held in the hand only and has two grips, which can be grasped from below, with switching keys on the underside. The programming device is held lying on the forearm, with one hand grasping one of the grips. The switches or keys located on the board surface can be actuated with the other hand. The switches and function keys are poorly accessible and cannot be reached without changing the grip. Holding is also fatiguing, so that this programming device is also ergonomically unfavorable for longer programming sessions, which are frequently necessary during the teaching of an industrial robot. In addition, no joystick is provided.

A modified device, which is also supported on the left forearm and wherein the grip is located at a lateral housing attachment at the right rear corner, has been known from *Asea Journal,* 1982, Vol. 55, No. 6, pp. 145–150. This handling brings with it the same drawbacks as the above-mentioned state of the art. The prior-art programming device has a multiaxially movable, upright standing joystick on the right side. An angular housing attachment, which likewise projects far forward and at which the ball of the thumb can be supported, but offers no possibility of gripping and holding for the device, is located before it. The programming device can be held with the left hand only. The programmer can operate the device with the right hand only, actuating either the joystick or the keys, for which he has to change his grip. This arrangement is not ergonomic.

JP-A-3-3787 shows a similar programming device with a lateral joystick, which can be pivoted from a horizontal resting position into an upright working position. There is no hand support here, which makes the device especially ergonomically unfavorable.

The prior-art programming devices are connected to the control box of the manipulator via a multiwire electric line and have no other communications capabilities. As a result, the operator is limited in his programming. Additional programming measures must be performed in the control box, which frequently makes it necessary to walk long distances. As a result, handling is impracticable and time-consuming.

The object of the present invention is to show an ergonomically better programming device.

The present invention accomplishes this object with the features in the principal claim.

The programming device according to the present invention has two or more, preferably four, ergonomically designed grip areas. Due to these different possibilities of gripping, the operator can hold the programming device in two or more different ways, preferably transversely and he can frequently change the position of his hands, which effectively prevents fatiguing phenomena. In addition, the grip areas are designed ergonomically and facilitate a low-fatigue holding of the hands.

At least two, but preferably three grip strips, which have an ergonomically especially favorable shape, are provided at the housing edges in the preferred embodiment. At least some of the function keys are also associated with the grip strips within the range of the fingers, so that the keys can be actuated with comfort, without the operator having to change the position of his hands or even to remove his hand from the board. The function keys are arranged on the top side of the housing and can be reached with the thumb in an ergonomically especially favorable manner.

One or more switching keys, which are designed as, e.g., a permission key and/or a start/stop key, are located on the underside of the housing in the vicinity of the grip strips and in a position favorable for gripping. It is also favorable for the switching keys and the function keys to be present in multiple numbers, so that the different functions provided can be performed from all gripping positions.

Additional device switches, key switches, emergency switches, etc., may be arranged on the top side of the device, preferably at the housing attachment. These switches are remote control elements of the robot, which permit a continuous programming far away from the robot control. Therefore, the operator does not have to go to the robot or to the control, as was usual before, to switch off drives, to set modes of operation, etc.

A projecting thumb ball pad is present at least at one grip strip in an ergonomically especially favorable manner. If a joystick is used as a multiaxially movable control member, it is recommended that it be arranged in the vicinity of the grip strip and the thumb ball pad. As a result, the control member can be reached and actuated comfortably from the grip strip, without the operator having to change his grip. There is a support for the hand, which improves the accuracy and the sensitivity during operation. In addition, the device can be held and the control member can be actuated at the same time, preferably with the right hand. It is also advantageous that the function keys are also located and can be actuated within the range of the thumb in this position of the hand, without the hand having to be removed from the control member or the grip strip.

The multiaxially movable control member is preferably designed as a joystick with at least three and preferably six axes. All movements of a usually six-axial industrial robot around the axes can thus be remotely controlled by a control member. The movements around the axes may be complex and superimposed. The ergonomic design also makes it possible to use the control member in different ways, e.g., as a mouse or as a movement or setting controller or key for setting parameters.

Besides the grip strips arranged at the housing edges, it is also recommended that a grip pin be arranged on the underside of the housing. Two pins, which act as desk supports with correspondingly beveled foot surfaces, are preferably present. As a result, the programming device can be placed on a firm support and be operated in an ergonomically favorable oblique position.

The programming device according to the present invention also has extensive communications possibilities. It has one or more interfaces for connection to external input or output devices, e.g., keyboards or display screens and/or external computing units. The latter may be, e.g., laptop computers for programming purposes, etc. The interfaces are preferably located recessed at the front or rear housing edge under the grip strip.

The interfaces preferably have electric contacts, but they may also have connection possibilities for other, e.g., optical transmission means, such as fiber-optic cables, etc. They also permit a wireless remote data transmission with radio, infrared light or other transmission if suitable transmitters/receivers are connected.

The interfaces may have different designs and accommodate cable plugs, interface cards or other suitable communications means. The underside or the front and/or rear housing edge is a favorable place. The outlet for the connection cable to the manipulator or to its control, if it cannot be omitted because of the wireless remote data transmission, is preferably also located in this area. The design makes possible an extensively trouble-free and ergonomic handling and operation of the programming device. In addition, the interfaces and cables are subject to low mechanical stresses in these areas.

Additional advantageous embodiments of the present invention are described in the subclaims.

The present invention is schematically represented in the drawings as an example. Specifically.

The drawings show a programming device (1), which is connected via a line (18), shown as a broken line, to the control box or the control of a multiaxial manipulator, preferably an at least six-axial industrial robot. The programming device (1) contains in its housing (2) a computing and control unit, not specifically shown and described, with which control commands can be transmitted to the manipulator with the control elements to be described in greater detail. The operator can remotely control the manipulator with the programming device (1) and program, e.g., its movement and/or function process. The operator may move away from the manipulator with the programming device (1) and operate the device from a safe location.

The programming device (1) has an essentially parallelepipedic, transverse housing with ergonomically rounded edges, which has three or more, preferably four, ergonomically designed grip areas (6, 7, 8, 9). As a result, the operator can hold and operate the programming device (1) in different ways.

The programming device (1) is preferably held in the transverse form with the hands at the lateral grip areas (7, 8). The side edges may slope somewhat inwardly toward the rear side (25) of the device, so that an ergonomically favorable, slightly trapezoidal, convergent position of the hands is obtained.

Grip strips (6, 7, 8), which are adapted to the shape of the hands and are made in one piece with or integrated within the housing (2), are located at two or more housing edges (25, 26). They have surfaces favorable for gripping, which are, e.g., roughened or are provided with grooves. The grip strips (6, 7, 8) are located at the rear housing edge (25) and the two lateral housing edges (26) in the preferred embodiment.

Figure 1:
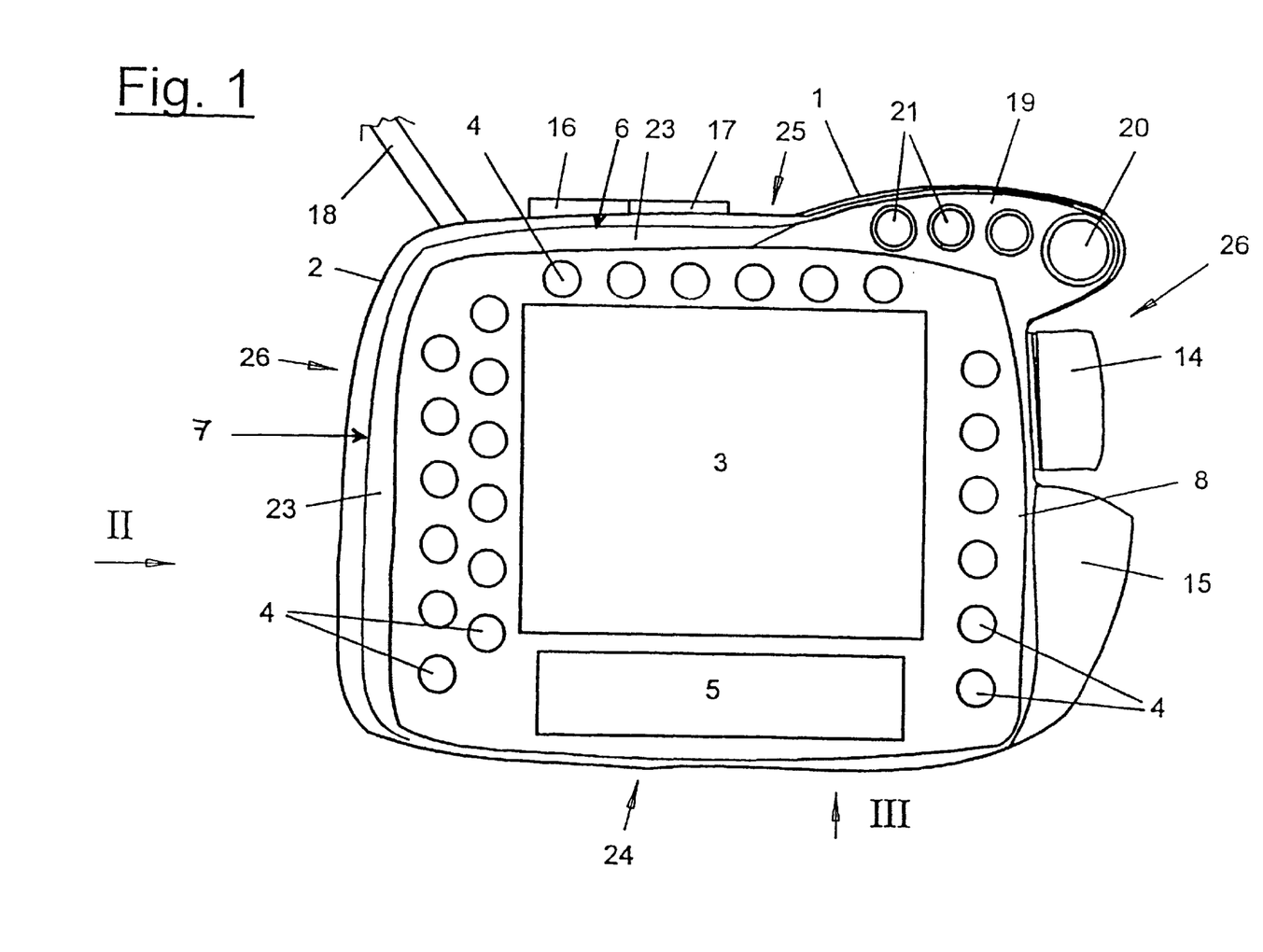
FIG. 1 shows a top view of the programming device.
Figure 2:
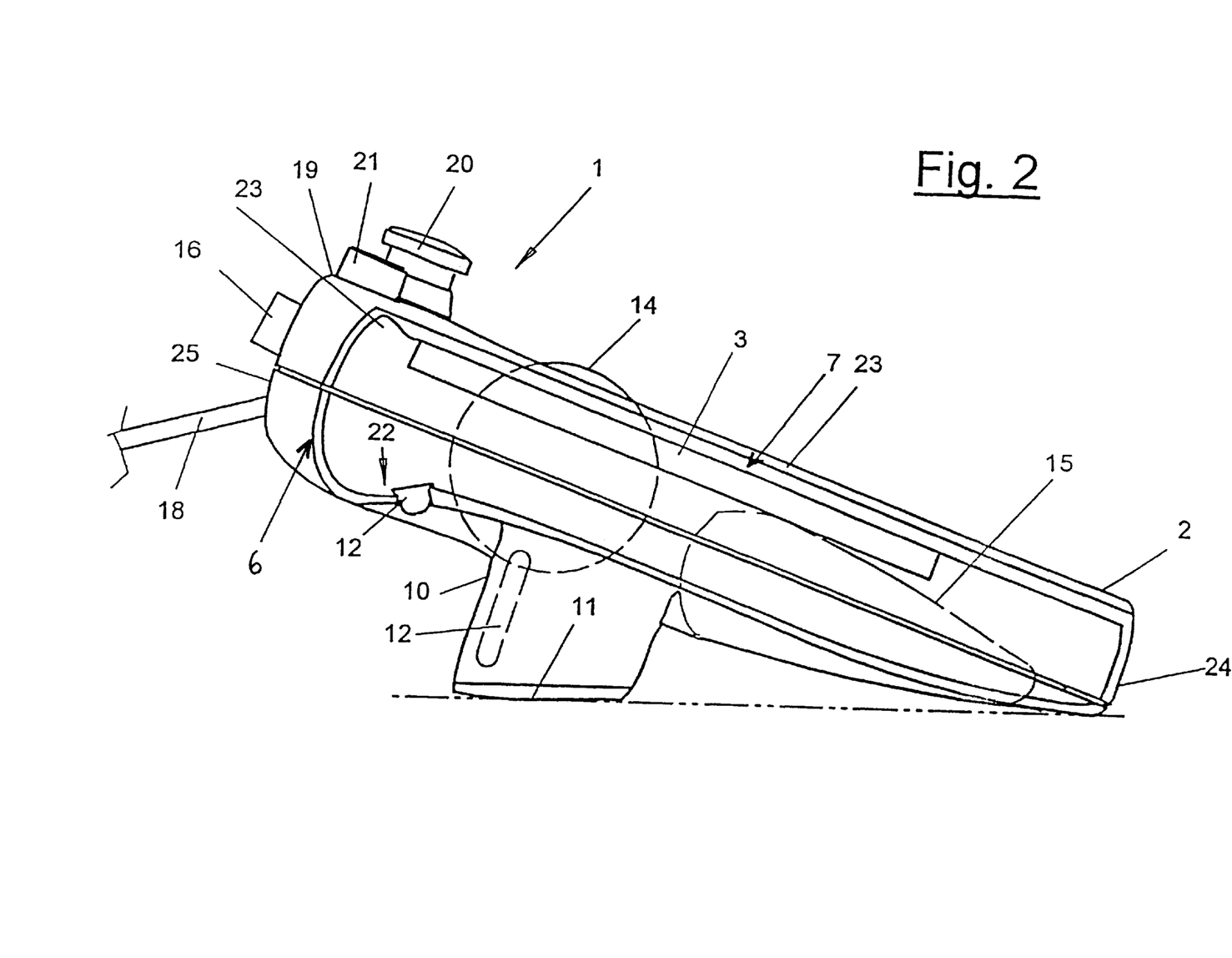
FIG. 2 shows a side view of the programming device corresponding to arrow II in FIG. 1.
Figure 3:
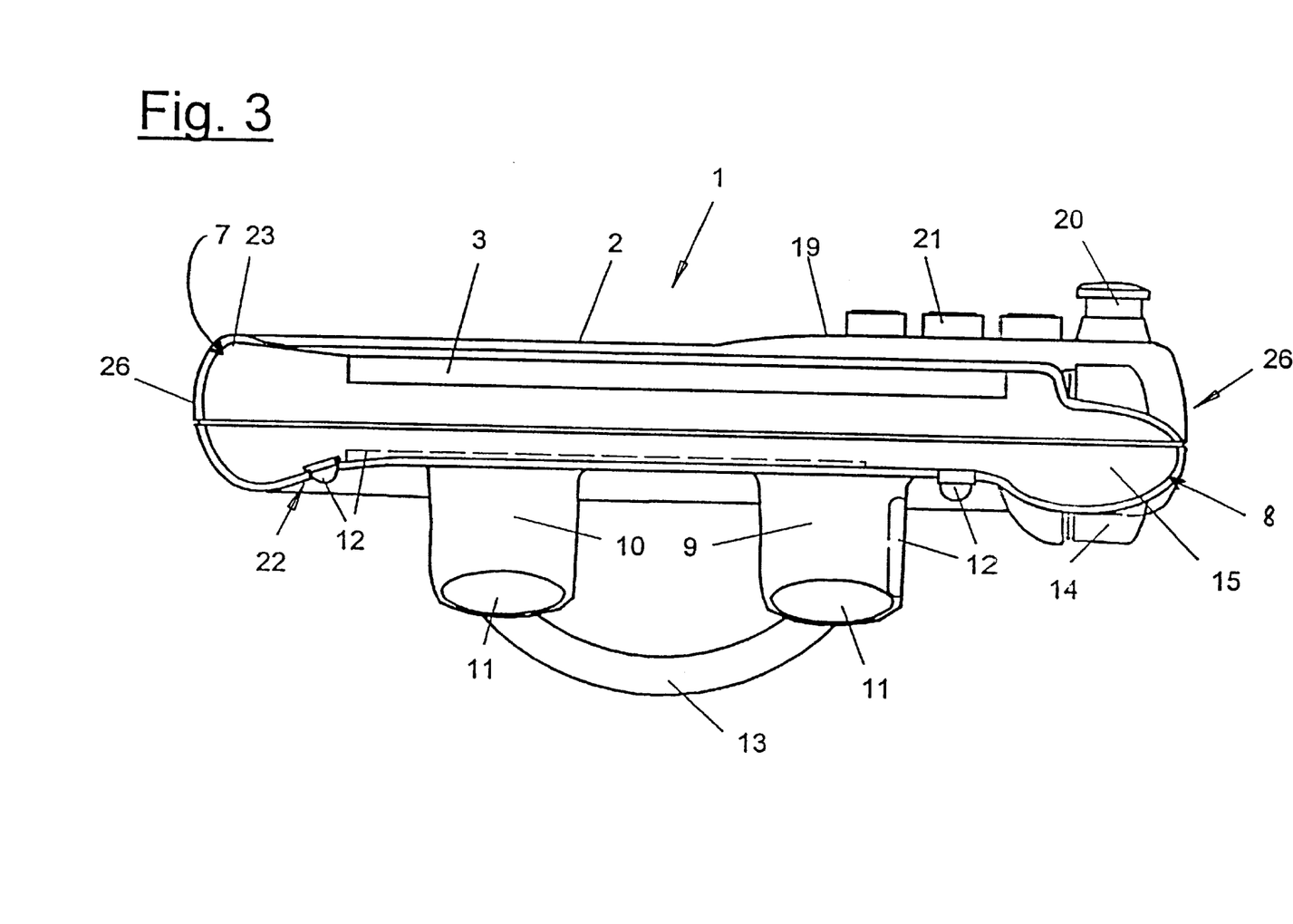
FIG. 3 shows a front view of the programming device according to arrow III in FIG. 1.

As is apparent from FIGS. 2 and 3, the rear and left-hand grip strips (6, 7) comprise a strip-shaped hump (23) made in one piece with the top side of the housing and a corresponding recessed grip (22) located on the underside of the housing. The humps (23) are used to support the carpal region of the hand along with the ball of the thumb. The fingers grasp around the housing edges (25, 26) and find support in the likewise strip-shaped recessed grips (22).

The grip strip (8) on the right-hand side (26) of the housing has a somewhat different design. It has a laterally projecting thumb ball pad (15), which is adapted to the shape of the hand and extends along the lateral housing edge (26). The thumb ball pad (15), which also forms a grip at the same time, expands starting from the top housing edge (24) and then tapers again. The level of the thumb ball pad (15) is somewhat lower than that of the surface of the housing. A longitudinally extending recessed grip (22) is likewise located on the underside. One or more recessed grips (22) may alternatively also be eliminated.

Figure 4:
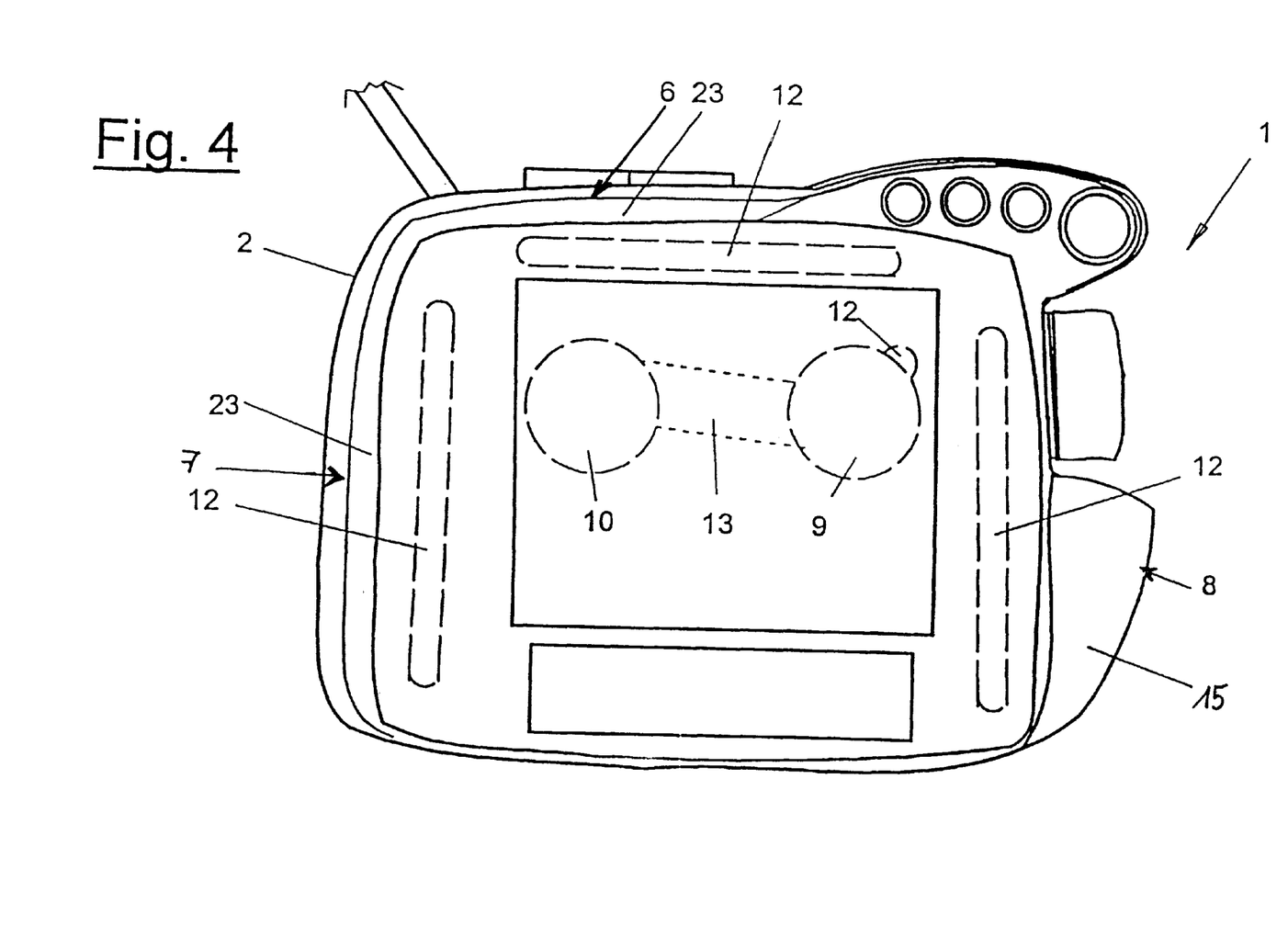
FIG. 4 shows a simplified top view according to FIG. 1 with the underside of the programming device made visible.

The fourth grip area (9) is arranged on the underside of the housing and comprises a grip pin (9) (cf. FIG. 4). This [pin] projects vertically from the underside of the housing and is located in the right-hand half of the programming device (1). It is intended for the left hand, and the programming device (1) can be supported on the forearm of the operator. A skin-friendly and soft coating may be arranged on the underside of the device in the area of the arm. The arrangement of the grip strip (8) or thumb ball pad (15) and of the grip pin (9) may also be transposed to the other side of the housing for lefthanders, so that the programming device (1) can also be adapted for lefthanders by correspondingly redesigning the housing (2).

The operator can hold the programming device (1) in at least three intended ways with the above-described grip areas (6, 7, 8, 9). On the one hand, he can grasp the lateral grip strips (7, 8) with both hands. He can also hold it by the rear grip strip (6) with the left hand and support it on the hip. The third possibility is the above-mentioned holding by the grip pin (9). Finally, the programming device (1) may also be placed on a support in an ergonomically especially favorable operating position in the manner described below.

Most of the control elements of the programming device (1) are arranged on the top side of the housing (2). A display (3), which is preferably designed as a multi-line color display with graphics capability, is preferably located in the middle area.

Color display screens as used for portable computers are preferably used for this purpose. Under it is arranged, e.g., a keyboard (5), which may contain an alphanumeric keyboard or a typewriter keyboard and optionally additional control keys, such as cursor keys or the like.

The movements and/or functions of the manipulator are controlled predominantly by function keys (4), which are preferably arranged above and on both sides of the display (3). They may also be present under the display (3). The function keys (4) are preferably arranged in one or two parallel rows, which extend in the vicinity of and along the grip strips (6, 7, 8). The function keys are arranged such that they are located within the reach of the fingers and can be easily and comfortably reached and especially with the thumb. Corresponding to the multiple arrangement of the grip areas (6, 7, 8), the function keys (4) may also be present in multiple numbers. As a result, the operator can trigger the same functions in a plurality of areas and in different grip areas. The function keys (4) may be designed as menu-driven soft keys and cooperate with an optical operator guide at the edge of the display.

Switching keys (12), which are preferably arranged in the area of the recessed grip (22), are located at one or more grip strips (6, 7, 8) on the underside of the housing. These are, e.g., permission keys and/or start/stop keys. As is shown in FIG. 4, the switching keys (12) may consist of elongated switching strips or a plurality of shorter switching elements. One or more switching keys (12) are also arranged at the grip pin (9) in such a way that they can be reached with the fingers. Another key (not shown) may optionally also be present in the area of the thumb.

The programming device (1) has a multiaxially movable control member (14), whose movements are transmitted to the translatory and rotary axes of the manipulator. The control member is designed as a six-axial joystick (14) for the six axes of the robot in the preferred embodiment.

The control member (14) is located at one of the two lateral housing edges (26) or lateral housing surfaces and can be reached from a grip strip (8) comfortably and without changing the grip. The control member (14) is preferably located at a closely spaced location behind the thumb ball pad (15) on the right side (26) of the housing.

The control member (14) is arranged horizontally and it laterally projects from the housing edge (26). It is directed essentially horizontally with its principal axis. The control member is designed as a joystick and has, contrary to the state of the art, a stump shape. The grip has no projecting shaft, but it is seated directly at the lateral housing edge (26). The grip is thicker than in prior-art joysticks and has a cylindrical or roller shape, whose shape and size are adapted to the concave shape of the hollow, slightly arched hand.

In the 6-D version, the joystick (14) can be rotated or tilted around the three space axes and can also be displaced translatorily around the three space axes. The hand of the operator is supported on the thumb ball pad (15) in the process, and the grip roller of the joystick (14) can be grasped and actuated with the thumb, the index finger and the middle finger. Via the grip strip (8) and the thumb ball pad (15), the operator can hold the device with the right hand and operate the joystick at the same time. In addition, he can reach and actuate the adjacent function keys (4) with the thumb at the same time. Changing the grip is not necessary.

The control member (14) may be switched over in terms of the dimension of movement and use and may optionally be programmable. As a result, it may be used as a mouse, with which, e.g., the cursor can be moved on the display (3), in the case of a 2-D switching over. In the case of a 1-D switching, the control member (14) may be used as a programmable movement or setting controller or key for setting a parameter. Thanks to the grip strip (8) or thumb ball pad (15), the control member (14) can be held motionless and be moved with the needed sensitivity and precision.

A housing attachment (19), which projects to the rear as well as to the side and extends over the control member (14) from behind, is preferably located at the right rear housing edge (25). An emergency switch (20) and one or more 'device switches (21) are located on the housing attachment (19). These are preferably on/off switches for the manipulator, its drives or the robot control. A device switch (21) may also be a key switch for setting the modes of operation of the robot control or for other purposes.

A second parallel pin (10) is preferably located next to the grip pin (9), preferably at a laterally spaced location therefrom, on the underside of the housing.

A holding strap (13), with which the programming device (1) can be additionally fastened to the hand, may also be located on the underside of the housing. As is illustrated by FIGS. 2 and 3, the pins (9, 10) may have beveled foot surfaces (11), which are sloped toward the front side (24) of the housing. As a result, the programming device (1) can be placed on a desk or another firm support in an oblique position in the manner shown in FIG. 2.

The programming device (1) has one or more electric interfaces (16, 17) for the connection of external communications means. These are preferably external input or output devices, e.g., a computer keyboard, a monitor or the like. The interfaces (16, 17) may also be used for connection to a computing unit, especially a portable computer. As a result, additional programming data can be entered at the programming device (1) on site and be transmitted directly to the robot control. The operator does not need to go to the control box to do so, but be can complete all control and programming tasks on site and all at once.

The interfaces (16, 17) may have electric plug contacts for cable plugs. In addition or as an alternative, they may have recessed slots with electric, optical or other contacts for interface cards. These may be, e.g., so-called PCMCIA terminals.

Telecommunications means, e.g., radio or infrared transmitters, network cards, modems, etc., may also be connected to the interfaces (16, 17) for communication with the control box, the robot control, a network, a higher manufacturing process control, or the like. The line (18) may optionally be omitted.

The interfaces (16, 17) may be arranged in any suitable area of the housing (2).

They are located on the underside of the programming device (1) and are arranged recessed in the preferred embodiment. However, they may also be located at the front and/or rear housing edge (24, 25). They are shown in the rear and projecting in FIG. 1 for clarity's sake. The interfaces (16, 17) may be located under the housing attachment (19). It is also possible to place them in the grip area (6, 7, 8, 9). The interfaces (16, 17) may optionally be present in multiple numbers and be distributed over different areas of the housing (2).

The line (18) is located, e.g., at the front or rear housing edge (24, 25) and in the area of the left corner. As a result, it is outside the grip areas (6, 7, 8) and does not interfere with any of the possible grip positions.

Various modifications of the embodiments shown are possible. Thus, fewer than the four grip areas (6, 7, 8, 9) described may be present. Function keys (4) or switching keys (12) also need not be arranged in all grip areas in the manner described. The joystick (14) as well as the interfaces (16, 17) may be omitted in a simplified embodiment. Modifications are also possible in the case of the display (3) and the keyboard (5), which may have a simpler design. Instead of the strip-shaped humps (23) and recessed grips (22), grip elements of a sturdier design may be present. The programming device (1) may have a carrying strap for hanging it over the shoulders or the neck.

The programming device (1) preferably comprises very lightweight components in order to keep the overall weight and the load on the operator as low as possible. Most of the above-described functional parts consist of plastic or other lightweight materials.

LIST OF REFERENCE NUMBERS

1 Programming device
2 Housing
3 Display
4 Function key
5 Keyboard
6 Grip area, grip strip
7 Grip area, grip strip
8 Grip area, grip strip
9 Grip area, pin, grip pin
10 Pin, support foot
11 Foot surface
12 Switching key
13 Holding strap
14 Control member, joystick 15 Thumb ball pad
16 Interface, keyboard
17 Interface, PC
18 Line
19 Housing attachment
20 Emergency switch
21 Device switch
22 Recessed grip
23 Hump
24 Front side of housing, front housing edge
25 Rear side of housing, rear housing edge
26 Housing side, lateral housing edge

What is claimed is:

1. A data input device for holding by a hand of an operator, the device comprising:
   a housing;
   a display on said housing;
   a plurality of function keys on said housing;
   a plurality of ergonomically shaped grip areas on said housing, said grip areas are formed in a strip shape and in one piece with a plurality of edges of said housing, a subset of said plurality of function keys is positioned within reach of fingers of the hand holding said housing by one of said grip areas.

2. A device in accordance with claim 1, wherein:
   said grip areas are positioned on a rear and on two lateral edges of said housing.

3. A device in accordance with claim 1, wherein:
   a subset of said plurality of function keys is positioned on a side of said housing opposite said display and within a reach of fingers of the hand holding said housing by one of said grip areas.

4. A device in accordance with claim 1, wherein:
   one of said grip areas has a projecting thumb ball pad.

5. A device in accordance with claim 1, wherein:
   one of said grip areas on a display side of said housing has hump shape means for supporting a thumb of the hand and for supporting a ball of the thumb, said one grip area also having a recessed grip for other fingers of the hand on an opposite side of said housing.

6. A device in accordance with claim 1, wherein:
   a plurality of switch keys are also provided on said housing;
   said function keys are positioned in range of a thumb of the hand holding one of said grip areas and said plurality of switch keys are located in an area of other fingers of the hand.

7. A device in accordance with claim 1, wherein:
   a subset of said function keys all perform a similar function.

8. A device in accordance with claim 1, wherein:
   an attachment including an emergency switch and a device switch, is arranged on said housing.

9. A device in accordance with claim 1, wherein:
   interface means for connection to an external communication device is arranged on said housing.

10. A device in accordance with claim 9, wherein:
    said interfaces is arranged recessed on said housing.

11. A device in accordance with claim 9, wherein:
    said interface has one of electric plug contacts and cable plugs.

12. A device in accordance with claim 9, wherein:
    said interface has slots with contacts for interface cards.

13. A device in accordance with claim 9, wherein:
    said communications device includes means for wireless data exchange and is connected to said interface.

14. A device in accordance with claim 1, wherein:
    said display is designed as a multi-line display with graphics capabilities.

15. A device in accordance with claim 1, wherein:
    a keyboard is arranged on said housing and is adjacent said display.

16. A data input device for holding by a hand of an operator, the device comprising:
    a housing;
    a display mounted on a display side of said housing;
    a plurality of function keys on said housing;
    a plurality of ergonomically shaped grip areas on said housing;
    a multiaxially movable control member is arranged on one lateral side of said housing, said one lateral side of said housing being substantially perpendicular to said display side.

17. A device in accordance with claim 16, wherein:
    said control member is designed as a joystick movable around six axes.

18. A device in accordance with claim 16, wherein:
    said control member is programmable for a selectable number of axes.

19. A device in accordance with claim 16, wherein:
    said control member has a stump-shaped design, and includes a grip arranged adjacent to an edge of said housing.

20. A device in accordance with claim 16, wherein:
    said control member includes a roller-shaped, thick grip.

21. A device in accordance with claim 16, wherein:
    said control member extends from one side of said housing and is arranged adjacent one of said grip areas.

22. A device in accordance with claim 21, wherein:
    said one of said grip areas has a projecting thumb ball pad
    said control member is arranged at adjacent said thumb ball pad.

23. A device in accordance with claim 16, wherein:
    an attachment including an emergency switch and a device switch, is arranged at a rear edge of said housing and extends adjacent to said control member.

24. The device in accordance with claim 16, wherein:
    said multiaxial movable control member extends outward from said one lateral side of said housing;
    one of said grip areas is arranged on another lateral side of said housing diametrically opposite said one lateral side.

25. The device in accordance with claim 16, wherein:
    said multiaxial movable control member extends substantially parallel with a plane of said display.

26. The device in accordance with claim 16, wherein:
    said multiaxial movable control member has a shape and size adapted to a concave shape of a hollow slightly arched hand.

27. A data input device for holding by a hand of an operator, the device comprising:
    a housing;
    a display on said housing;

a plurality of function keys on said housing;

a plurality of ergonomically shaped grip areas on said housing;

two projecting pins are arranged at spaced locations from each other on a side of said housing opposite said display, one of said projecting pins is designed as a grip pin for grasping by the hand.

28. A device in accordance with claim 27, wherein:

said grip pin has a switching key and a holding strap.

29. A device in accordance with claim 27, wherein:

said projecting pins have a foot surface beveled toward a front side of said housing.

* * * * *

UNITED STATES PATENT AND TRADEMARK OFFICE
CERTIFICATE OF CORRECTION

PATENT NO. : 6,134,102
DATED : October 17, 2000
INVENTOR(S) : Horn et al.

It is certified that error appears in the above-indentified patent and that said Letters Patent is hereby corrected as shown below:

ON THE TITLE PAGE

[30] Foreign Application Priority Data
    Jul. 22, 1995 [DE] Germany.......... 295 11 862 U
    Jul. 22, 1995 [DE] Germany.......... 295 11 863 U
    Jul. 22, 1995 [DE] Germany.......... 295 11 864 U Signed and Sealed this Eighth Day of May, 2001

Attest:

NICHOLAS P. GODICI

Attesting Officer     Acting Director of the United States Patent and Trademark Office